Figure 1:
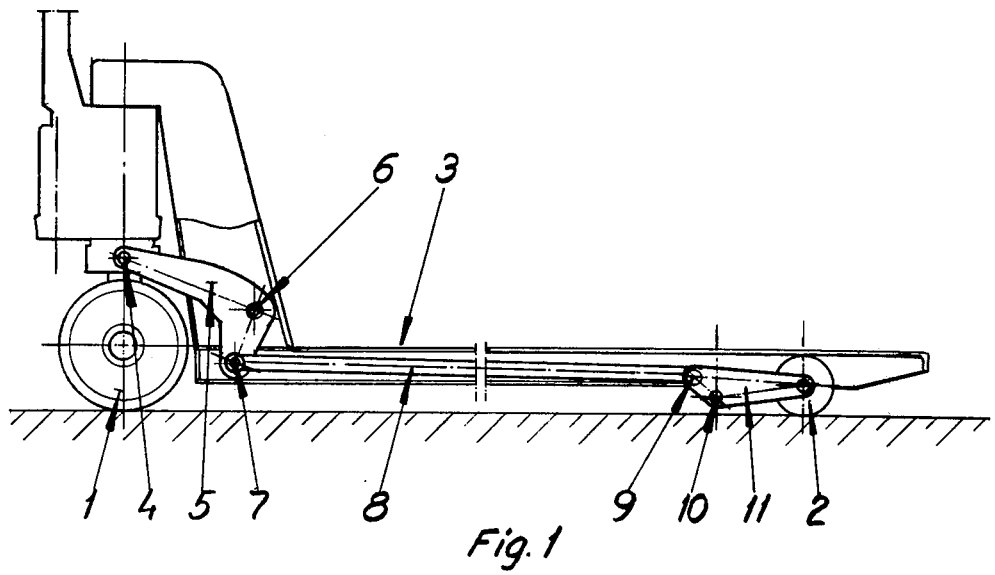

United States Patent
Bryntse

[11] 3,876,221
[45] Apr. 8, 1975

[54] LIFTING VEHICLES HAVING A LOAD CARRYING MEMBER
[75] Inventor: Anders Ivar Bryntse, Mjolby, Sweden
[73] Assignee: AB Bygg-Och Transportekonomi (BT), Mjolby, Sweden
[22] Filed: Sept. 25, 1973
[21] Appl. No.: 400,628

[30] Foreign Application Priority Data
Sept. 27, 1972 Sweden.............................. 12445/72

[52] U.S. Cl............................... 280/43.12; 254/2 C
[51] Int. Cl............................................. B62d 33/08
[58] Field of Search............... 280/43.12; 180/19 R; 254/2 C, 10 C

[56] References Cited
UNITED STATES PATENTS
1,897,637   2/1933   Fernstrom........................... 254/2 C
3,072,418   1/1963   Becker............................. 280/43.12

FOREIGN PATENTS OR APPLICATIONS
962,199   4/1957   Germany........................ 280/43.12
 76,393   3/1950   Norway.......................... 280/43.12
1,163,456   9/1969   United Kingdom.............. 280/43.12

*Primary Examiner*—David Schonberg
*Assistant Examiner*—Michael J. Forman
*Attorney, Agent, or Firm*—Young & Thompson

[57] ABSTRACT
A lifting vehicle is provided with a load carrying member which contains a link system for moving the load carrying member vertically. In said link system is included a push rod which extends substantially in the same direction as the load carrying member itself. This push rod is asymmetrically pivoted in relation to its longitudinal axis so an eventual transverse bending of it is forced to take place in only one direction where its bending is stopped by means included in the load carrying member and placed near the push rod in said bending direction, thereby determining the bending limit.

5 Claims, 2 Drawing Figures

PATENTED APR 8 1975  3,876,221

LIFTING VEHICLES HAVING A LOAD CARRYING MEMBER

The present invention relates to a lifting vehicle having a load carrying member containing a push rod extending in substantially the same direction as the member itself, said push rod being included in a link system for raising the load carrying member parallel to the floor or ground level.

When lifting heavy loads this push rod is subject to large pressure forces and therefore it has been up to now greatly oversized in order to prevent buckling. In present devices the push rod usually consists of a steel rod of round or square cross section.

The present invention makes it possible to decrease the dimensions of the push rod considerably and to obtain greater function security, at the same time making the device cheaper.

According to the invention the push rod is asymmetrically mounted in such a way that an eventual bending of the push rod caused by the longitudinal pressure always will be directed in one direction and that the push rod in the bending direction is placed so near to the load carrying member itself or to other elements normally present in said member, that such bending of the push rod will be limited, by means of the load carrying member or said elements, to values settled in advance.

Figure 2:
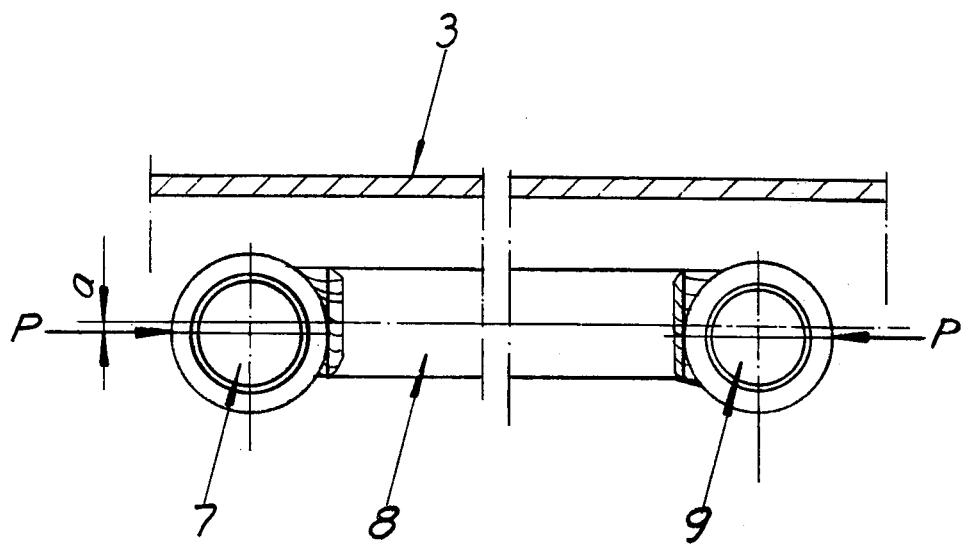

A preferred embodiment of the invention will now be described by way of example with reference to the accompanying drawing wherein:

FIG. 1 as a side view shows a lifting vehicle including the device according to the invention, and FIG. 2 also shows as a side view a detail included in the device according to FIG. 1.

In the drawing 1 is a front wheel, usually steerable, of a lifting vehicle, the rear wheels of which are designated 2. 3 is a load carrying, vertically movable member, controlled by a link system, the parts of interest for the invention being designated 4–11. Of these parts 5 is a lever having a pivot 4 movable in vertical direction and through another pivot 6 connected to the load carrying member 3. Through a further pivot 7 the lever 5 is connected to a push rod 8, which in turn through a pivot 9 is connected to a link 11 connected to the load carrying member 3 through a pivot 10.

When the pivot 4 is pressed down the lever 5 is turned anti-clockwise about the pivot 6 and the push rod 8, connected to the lever 5 through the pivot 7, is forced to the right. The other pivot 9 of the push rod 8 will thereby cause the link 11 to turn in clockwise direction about the pivot 10, thus raising the load carrying member 3.

According to the invention the push rod 8 is asymmetrically mounted, so that it is given an upwardly directed bending action. This can be accomplished in many ways, of which one is shown in FIG. 2. The bending centre of the push rod is here placed the distance "$a$" above the centres of the pivots 7 and 9. This means that a bending, if any, will be directed upwards. Due to the fact that the loading carrying member 3 is placed immediately above the push rod the bending will be stopped before arriving at the yield point of the material meaning that the push rod will spring back when the load is removed. Alternatively a small remaining deformation can be allowed.

Due to this arrangement the dimensions of the push rod can be considerably decreased and greater function security will be achieved, at the same time making the device cheaper.

I claim:

1. In a lifting vehicle having a load-carrying member containing a link system for moving said load-carrying member vertically, said link system including a push rod extending substantially in the same direction as the load-carrying member; the improvement in which said push rod is asymmetrically pivoted in relation to its longitudinal axis thereby to force bending of said push rod in an upward direction upon the application of force sufficient to bend said push rod, and stop means closely adjacent and above said push rod to limit any movement of said push rod.

2. A lifting vehicle as claimed in claim 1, said stop means comprising the underside of said load-carrying member.

3. A lifting vehicle as claimed in claim 1, said stop means being so positioned as to limit bending of said push rod to within the plastic deformation range of said push rod.

4. A lifting vehicle as claimed in claim 1, in which said stop means is positioned from said push rod a distance such that a portion of such bending lies within the plastic deformation range of said push rod.

5. A lifting vehicle as claimed in claim 1, said push rod being pivoted at both of its ends about horizontal axes, the bending center of the push rod being spaced above both said horizontal axes.

* * * * *